(12) United States Patent
Marcinuk et al.

(10) Patent No.: US 9,684,146 B2
(45) Date of Patent: Jun. 20, 2017

(54) TEMPERATURE INSENSITIVE PRECISION LOCKING APPARATUS FOR USE WITH LARGE APERTURE ADJUSTABLE OPTIC MOUNTS

(71) Applicant: BAE Systems Information and Electronic Systems Integration Inc., Nashua, NH (US)

(72) Inventors: Adam J. Marcinuk, Lyndeborough, NH (US); Michael J. Shaw, Concord, NH (US); David E. Thompson, Nashua, NH (US)

(73) Assignee: BAE Systems Information and Electronic Systems Integration Inc., Nashua, NH (US)

(*) Notice: Subject to any disclaimer, the term of this patent is extended or adjusted under 35 U.S.C. 154(b) by 0 days.

(21) Appl. No.: 14/769,895

(22) PCT Filed: Sep. 19, 2014

(86) PCT No.: PCT/US2014/056490
§ 371 (c)(1),
(2) Date: Aug. 24, 2015

(87) PCT Pub. No.: WO2015/099852
PCT Pub. Date: Jul. 2, 2015

(65) Prior Publication Data
US 2016/0004027 A1 Jan. 7, 2016

Related U.S. Application Data

(60) Provisional application No. 61/920,125, filed on Dec. 23, 2013.

(51) Int. Cl.
*F16C 11/10* (2006.01)
*G02B 7/00* (2006.01)
*G02B 7/18* (2006.01)

(52) U.S. Cl.
CPC ............ *G02B 7/008* (2013.01); *F16C 11/103* (2013.01); *G02B 7/181* (2013.01)

(58) Field of Classification Search
CPC .. F16B 9/023; F16B 9/02; F16B 9/026; F16B 9/00; F16B 7/0426; F16B 7/048;
(Continued)

(56) References Cited

U.S. PATENT DOCUMENTS 2,047,219 A * 7/1936 Meyer ...................... G05G 1/12
188/74
3,588,232 A * 6/1971 Mostel ................. G02B 7/1825
248/181.1
(Continued)

FOREIGN PATENT DOCUMENTS

DE 10102136 A1 * 9/2002 ............. B60R 11/00
FR 1118539 A * 6/1956 ................ F16B 7/02
WO 2015/099852 A2 7/2015

OTHER PUBLICATIONS

International Search Report corresponding to PCT/US2014/056490 dated Jun. 4, 2015.
(Continued)

*Primary Examiner* — Matthieu F Setliff
(74) *Attorney, Agent, or Firm* — Davis & Bujold, PLLC

(57) ABSTRACT

A temperature insensitive locking apparatus for use with large optical mounts having at least one locking nut having an internal threaded portion adjacent to an internal tapered portion, at least one flexurized spring collet attached to a rigid base structure having an external threaded portion and a plurality of tapered flexures, a pivot shaft engaged with an optical yoke on a rotational axis of symmetry wherein when the internal threads of the locking nut engage with the external threads of the flexurized spring collet an increased level of a radial clamping force is provided around the pivot shaft.

20 Claims, 4 Drawing Sheets

(58) Field of Classification Search
CPC ...... F16B 7/04; F16B 7/02; F16B 3/06; F16B 2/06; F16B 2/065; F16C 11/103; Y10T 403/76; Y10T 403/4628; Y10T 403/4631; Y10T 403/4637; Y10T 403/4674; Y10T 403/4677; Y10T 403/4688; Y10T 403/3926; Y10T 403/3933; Y10T 403/3946; Y10T 403/3953; Y10T 403/3961; Y10T 403/3966; Y10T 403/3993; Y10T 403/33; Y10T 403/335; Y10T 403/63; Y10T 403/635

See application file for complete search history.

(56) References Cited

U.S. PATENT DOCUMENTS

| | | |
|---|---|---|
| 4,156,557 A | 5/1979 | Skewis |
| 5,419,522 A | 5/1995 | Luecke et al. |
| 5,909,324 A | 6/1999 | Bryant et al. |
| 6,016,230 A | 1/2000 | Nunnally et al. |
| 2013/0200062 A1 | 8/2013 | Diening et al. |

OTHER PUBLICATIONS

Written Opinion corresponding to PCT/US2014/056490 dated Jun. 4, 2015.

* cited by examiner

TEMPERATURE INSENSITIVE PRECISION LOCKING APPARATUS FOR USE WITH LARGE APERTURE ADJUSTABLE OPTIC MOUNTS

STATEMENT OF GOVERNMENT INTEREST

This invention was made with United States Government support under contract No. 11-C-8877 awarded by a classified customer. The United States Government has certain rights in this invention.

CROSS-REFERENCE TO RELATED APPLICATIONS

This application claims rights under 35 USC §119(e) from U.S. Application Ser. No. 61/920,125 filed 23 Dec. 2013, the contents of which are incorporated herein by reference.

TECHNICAL FIELD

The present disclosure relates generally to optical mounts, more particularly to optical mounts that allows for temperature insensitive operation and near-zero "lock-and-walk" when used with large aperture optics.

BACKGROUND

Most commercial optical mounts suffer from a variety of problems when trying to use them outside of a laboratory environment. One major problem is that the commercial optical mounts tend to drift in angle over relatively small temperature variations. Secondly, they also suffer from "lock-and-walk", meaning that once the optical mount is aligned and adjusted properly, it then needs to be locked into place, and the act of locking it actually induces forces that cause the mount to move from its aligned position. For relatively small optics, such as those used in laser systems, these common problems have been addressed by using precision, customized, flexure-based optical mounts. For larger optics, such as those used in imaging systems, the dimensional scaling of existing mount designs results in bulky and massive devices. Precision mounting of large optical elements, which are intended to be used over wide temperature ranges and/or vibration profiles, is often a challenging engineering effort.

Conventional optical element mounts are generally not suitable to stably position optical elements which will be used in rugged temperature and vibration environments, especially as the optical elements increase in size. Typically, conventional adjustable optical element mounts are suspended from a base support structure by a system of screw jacks and springs.

In conventional optical mounts, an optical element is normally affixed to a plate that is suspended from, and movable with respect to, a backup support plate that is firmly mounted to an optical bench. In a free-space laser system, for example, as the laser beams are generally directed substantially horizontal, the optical element's surface normals are typically positioned to be perpendicular to gravitational forces. Thus, the optical elements are cantilevered from the surface of a support backup plate which must rigidly support the weight of the optical element suspended therefrom. The use of these commercially-available optical mount designs is common practice for laboratory-based optical systems. However, because of the cantilevered design, and lack of locking features, optical mounts of this design prove completely unsuitable as the size of the optical element increases and/or the environmental conditions worsen.

Further, in conventional optical mounts, the tip and tilt adjustment are separately operated by different mechanisms. However, both adjustment mechanisms operate on the same optical element support plate in such a way that leads to a common problem known as "crosstalk", in which the adjustment of one axis results in a small amount of unintended motion in the other independent orthogonal axis.

In other conventional mounts, a series of springs between the rigid support plate and the moveable plate upon which the optical element (e.g. a mirror) is mounted, provides a force that maintains one or more optical mount actuators in compression or tension, thereby stabilizing the optical element. However, conventional type spiral springs have little or no resistance to shear forces, which are unsuitable for supporting heavy optical elements cantilevered from the rigid mount. Therefore, pins or ball type sockets are generally required to support the moveable plate. These supporting devices introduce frictional hysteresis and crosstalk which inherently reduces the required position accuracy and stability of the optical elements.

Further, where screw type actuation is manually or mechanically manipulated to position the optical elements, some type of locking mechanism is frequently desired. During activation of the locking mechanism, positioning errors may be introduced. For example, the simple procedure of tightening a setscrew to lock an optical element usually requires tedious and time-consuming trial-and-error to align the one or more mirrors to a desired setting.

Additionally, for example in a laser system, the efficiency of a laser is critically dependent on the angular alignment of the optical components defining the laser resonator. Mechanical vibrations and ambient temperature changes transmitted to the optical mount assemblies jeopardize the mirror alignment of the laser system and negatively affect overall system performance.

A need, therefore, exists for an improved apparatus that overcomes the above referenced drawbacks.

SUMMARY

The following summary is provided to facilitate an understanding of some of the innovative features unique to the disclosed embodiments and is not intended to be a full description. A full appreciation of the various aspects of the embodiments disclosed herein can be gained by taking into consideration the entire specification, claims, drawings, and abstract as a whole.

It is, therefore, one aim of the disclosed embodiments to provide for a temperature insensitive locking apparatus for use with large optic mounts. The apparatus comprising at least one locking nut, at least one flexurized spring collet attached to a rigid base structure, a pivot shaft engaged with an optical yoke on a rotational axis of symmetry, and a plurality of threads that joins the locking nuts with the flexurized spring collet. The optical yoke provides mounting for an optical component and the threads provide an increased level of a radial clamping force into the pivot shaft.

It is, therefore, one aim of the disclosed embodiments to provide for a temperature insensitive locking apparatus for use with large optic mounts comprising a flexurized spring collet having a ramp angle that engages with a matched locking nut.

It is, therefore, one aim of the disclosed embodiments to provide for a temperature insensitive locking apparatus for use with large optic mounts in which the locking nut as it is tightened along the flexurized spring collet generates an interference that causes all flexures in the flexurized spring collet to squeeze down onto the pivot shaft, applying a purely symmetrical radial force during the locking process.

It is, therefore, one aim of the disclosed embodiments to provide for a temperature insensitive locking apparatus for use with large optic mounts in which the pivot shaft is located on either side of the optical yoke.

It is, therefore, one aim of the disclosed embodiments to provide for a temperature insensitive locking apparatus for use with large optic mounts in which the flexurized spring collet is located on either side of the rigid base structure.

It is, therefore, one aim of the disclosed embodiments to provide for a temperature insensitive locking apparatus for use with large optic mounts in which neither the optical yoke nor the pivot shaft are directly contacted by a rotating locking device (e.g. locking nut, screw, etc.).

It is, therefore, one aim of the disclosed embodiments to provide for a temperature insensitive locking apparatus for use with large optic mounts in which the apparatus and the optical yoke pivot shaft are made of materials with the same coefficient of thermal expansion.

It is, therefore, one aim of the disclosed embodiments to provide for a temperature insensitive locking apparatus for use with large optic mounts in which the optical yoke and pivot shaft rotate as a single unit about the rotational axis of symmetry that is common to the pivot shaft, the flexurized spring collet, and the locking nut.

It is, therefore, one aim of the disclosed embodiments to provide for a temperature insensitive locking apparatus for use with large optic mounts in which the optical component being of a potential variety of types (e.g. mirrors, beam splitters, prisms, off-axis parabolic reflectors, etc.), requires angular or translational adjustment.

It is, therefore, one aim of the disclosed embodiments to provide for a system for securely and stably mounting precision-aligned optical components in a rugged environment comprising an optical yoke for providing a mounting for at least one optical component for example, an optical mirror and a temperature insensitive locking apparatus for locking the position of the optical component after being aligned. The temperature insensitive locking apparatus comprising at least one locking nut, at least one flexurized spring collet attached to a rigid base structure, a pivot shaft engaged with the optical yoke on a rotational axis of symmetry, and a plurality of threads that joins the locking nuts with the flexurized spring collet. The threads provide an increased level of a radial damping force onto the pivot shaft.

It is, therefore, one aim of the disclosed embodiments to provide for a system for securely and stably mounting precision-aligned optical components in a rugged environment in which the locking nut tightened along the flexurized spring collet generates an interference that causes all flexures in the flexurized spring collet to squeeze down onto the pivot shaft, applying a purely symmetrical radial force during the locking process.

It is, therefore, one aim of the disclosed embodiments to provide for a system for securely and stably mounting precision-aligned optical components in a rugged environment in which the flexurized spring collet comprises a ramp angle that engages with a matching locking nut.

It is, therefore, one aim of the disclosed embodiments to provide for a system for securely and stably mounting precision-aligned optical components in a rugged environment in which the pivot shaft is located on either side of the optical yoke.

It is, therefore, one aim of the disclosed embodiments to provide for a system for securely and stably mounting precision-aligned optical components in a rugged environment in which the flexurized spring collet is located on either side of the rigid base structure.

It is, therefore, one aim of the disclosed embodiments to provide for a system for securely and stably mounting precision-aligned optical components in a rugged environment in which neither the optical yoke nor the pivot shaft are directly contacted by a rotating locking device (e.g. locking nut, screw, etc.).

It is, therefore, one aim of the disclosed embodiments to provide for a system for securely and stably mounting precision-aligned optical components in a rugged environment in which the apparatus and the optical yoke and pivot shaft are made of materials with the same coefficient of thermal expansion.

It is, therefore, one aim of the disclosed embodiments to provide for a system for securely and stably mounting precision-aligned optical components in a rugged environment in which the optical yoke and pivot shaft rotate as a single unit about the rotational axis of symmetry that is common to the pivot shaft, the flexurized spring collet, and the locking nut.

It is, therefore, one aim of the disclosed embodiments to provide for a locking mechanism that securely and stably mounts precision-aligned optical components in a rugged environment.

It is, therefore, one aim of the disclosed embodiments to provide for a locking mechanism that addresses the need for temperature insensitive operation and near-zero "lock-and-walk" problems for large aperture optics by utilizing a flexurized spring collet, a locking nut, and a pivot shaft.

It is, therefore, one aim of the disclosed embodiments to provide for a locking apparatus that is suitable to use with a variety of optical mount sizes.

BRIEF DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the disclosure is not limited to specific methods and instrumentalities disclosed herein. Moreover, those in the art will understand that the drawings are not to scale. Wherever possible, like elements have been indicated by identical numbers.

DETAILED DESCRIPTION OF ILLUSTRATIVE EMBODIMENTS

The particular configurations discussed in the following description are non-limiting examples that can be varied and are cited merely to illustrate at least one embodiment and are not intended to limit the scope thereof.

A temperature insensitive locking apparatus for use with large optical mounts is disclosed. The apparatus comprises at least one locking nut, at least one flexurized spring collet attached to a rigid base structure, a pivot shaft engaged with an optical yoke on a rotational axis of symmetry and a plurality of threads that joins the at least one locking nut with the flexurized spring collet. The threads provide an increased level of a radial clamping force onto the pivot shaft. The interference generated between the locking nut and the spring collet causes all flexures to squeeze down onto the shaft, applying a purely symmetrical radial force during the locking process. This eliminates any induced rotational torque and prevents a mirror from moving during the locking process after being properly aligned.

Figure 1:
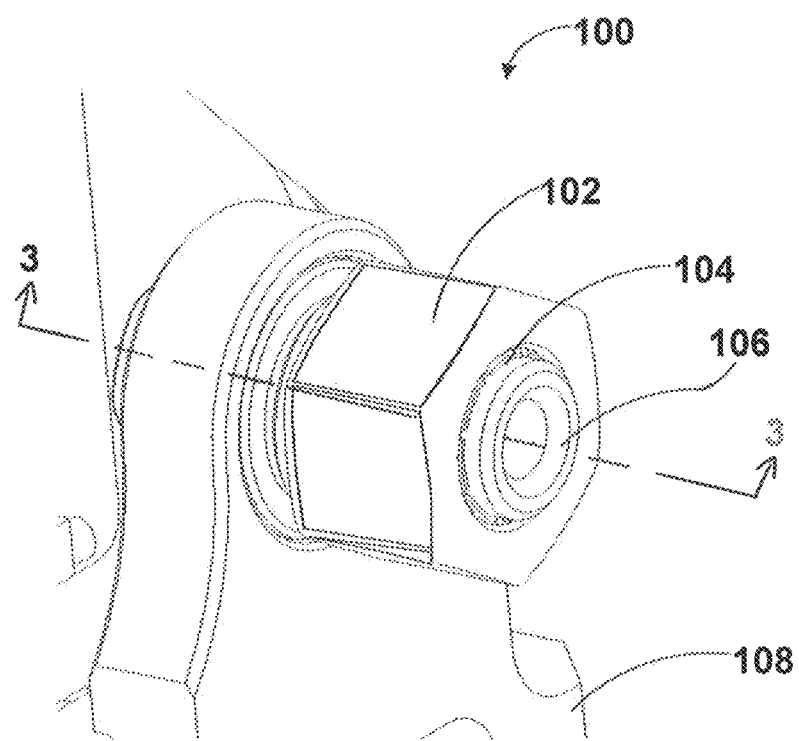
FIG. 1 is an illustration of a perspective view of a locking apparatus for use with large optical mounts, in accordance with the disclosed embodiments.

Referring to FIG. 1, a temperature insensitive locking apparatus 100 for use with large optical mounts is disclosed. The apparatus 100 comprises at least one locking nut 102, at least one flexurized spring collet 104 attached to a rigid base structure 108, a pivot shaft 106 engaged with an optical yoke (not shown) on a rotational axis of symmetry and a plurality of threads (not shown) that join the at least one locking nuts 102 with the flexurized spring collet 104. The threads provide an increased level of a radial clamping force into the pivot shaft 106. A cross section along line III-III is shown in FIG. 3.

The locking mechanism apparatus 100 securely and stably mounts precision aligned optical components in a rugged environment with the use of the flexurized spring collets 104, locking nuts 102, and pivot shaft 106. The thread is a feature on both the flexurized spring collet 104 and the locking nut 102. The flexurized spring collet 104 and the locking nut 102 both have mating thread features that provide a means to join them together. As the locking nut 102 threads further onto the flexurized spring collet 104, an increasing level of radial clamping force is exerted onto the pivot shaft 106.

Figure 2:
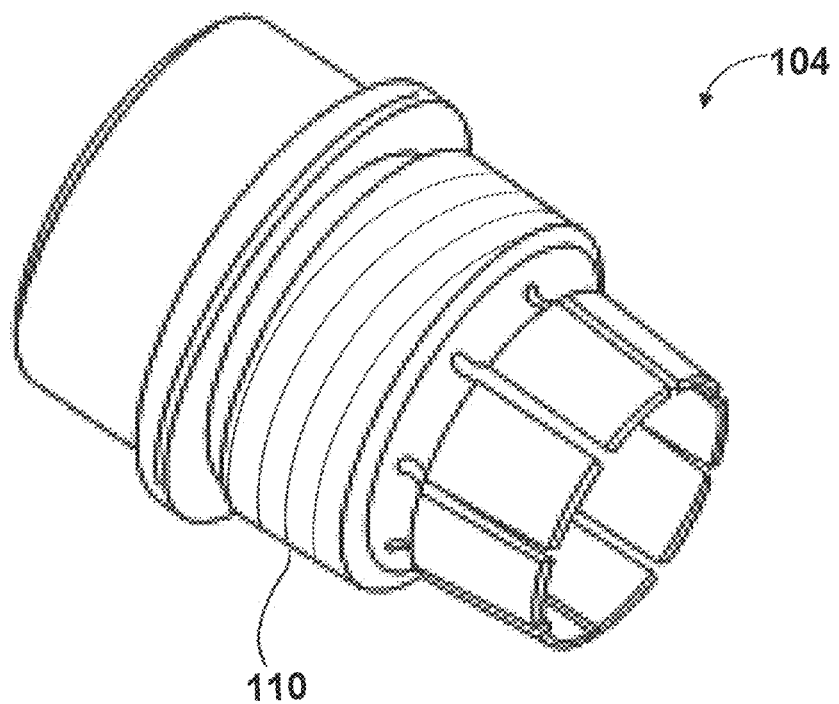
FIG. 2 is an illustration of a perspective view of a flexurized spring collet of the locking apparatus depicted in FIG. 1, in accordance with the disclosed embodiments.

The flexurized spring collet 104 is depicted in FIG. 2 and it comprises a ramp angle (not shown) that engages with a matching locking nut 102. As the locking nut 102 is tightened along the flexurized spring collet 104 it generates an interference that causes all flexures in the flexurized spring collet 104 to squeeze down onto the pivot shaft 106, applying a purely symmetrical radial force during the locking process. A pivot shaft 106 is located on either side of the optical yoke and the flexurized spring collet 104 is located on either side of the rigid base structure 108.

Figure 3:
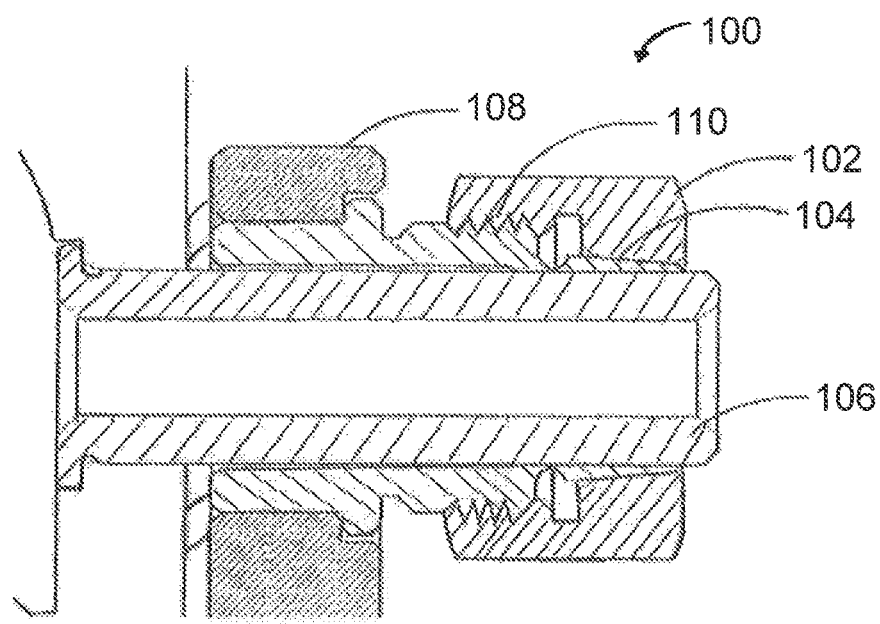
FIG. 3 shows the sectional view of the locking apparatus of FIG. 1 along III-III, in accordance with an embodiment of the present invention.

FIG. 3 shows the cross-sectional view of the locking apparatus 100 of FIG. 1 along line III-III, in accordance with an embodiment of the present invention. At the time of fixing the optical component, the locking nut 102 is tightened along the spring collet 104. The interference generated between the locking nut 102 and the spring collet 104 causes the all of the flexures of the flexurized collet to squeeze down onto the pivot shaft 106, applying a purely symmetrical radial force during the locking process. This eliminates any induced rotational torque and prevents a mirror from moving during the locking process after being properly aligned. FIG. 3 shows the threads 110 of the locking nut 102 and the spring collet 104 joined together at the time of tightening the locking nut 102 along the spring collet 104.

Figure 4:
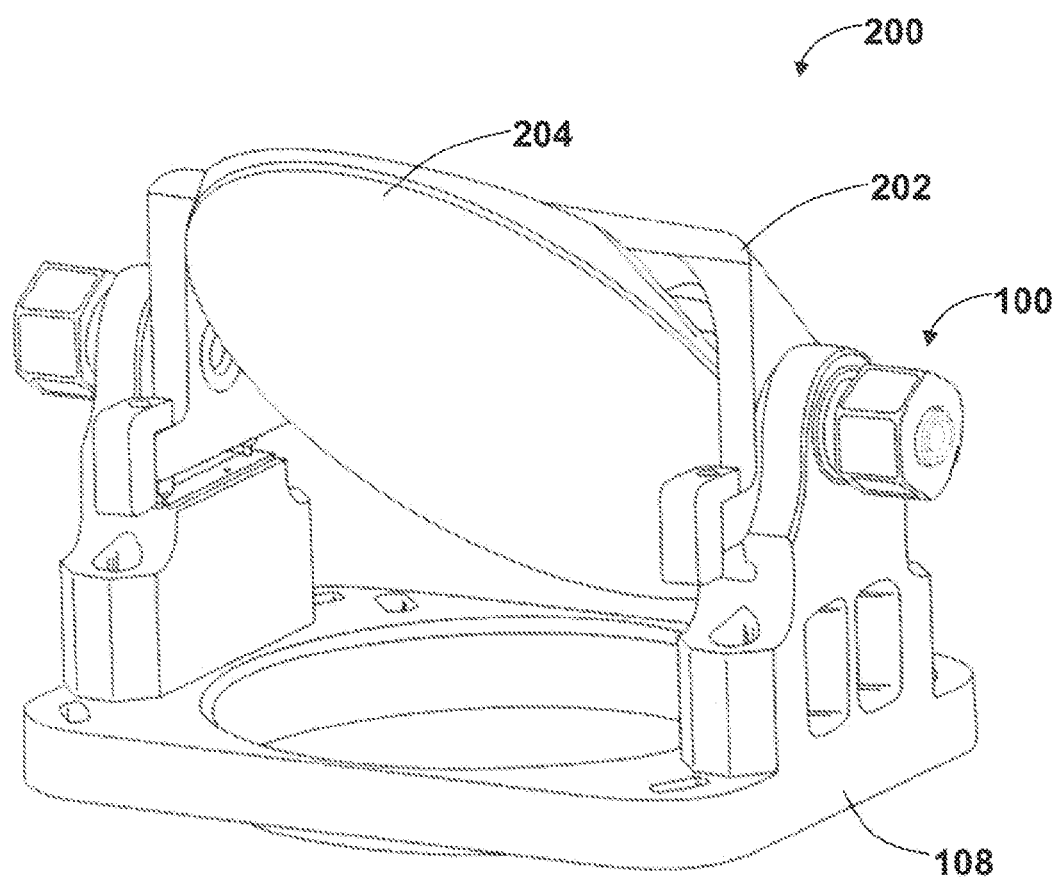
FIG. 4 shows an optical mount utilizing the locking apparatus of FIG. 1, in accordance with an embodiment of the present invention.

Referring to FIG. 4, the optical mount 200 utilizing the locking apparatus 100 of FIG. 1 is disclosed. The optical yoke 202 holding an optical component 204 is aligned at a required angle and then fixed in position utilizing the locking apparatus 100. Neither the optical yoke 202 nor the pivot shaft 106 is directly contacted by the locking nut 102. The locking apparatus 100 and the optical yoke 202 are made of materials with the same coefficient of thermal expansion.

In one embodiment, the locking apparatus 100 and the optical yoke 202 are made of stainless steel material. The optical yoke 202 and pivot shaft 106 can rotate as a single unit about the rotational axis of symmetry that is common to the pivot shaft 106, the flexurized spring collet 104, and the locking nut 102. The optical component 204 can be, for example, an optical mirror, and the like, without limitation.

The pivot shaft 106 is rigidly attached to the optical yoke 202. Examples of ways that the pivot shaft 106 can rigidly attach to the optical yoke 202 include, but are not limited to, use of a shrink fit, press fit, bonding, clamping, bolting, and the like. The purpose of the optical yoke 202 is to provide a mounting point for the optical component for example, a mirror. Neither the optical yoke 202 nor the pivot shaft 106 are directly contacted by the locking nut 102. The optical yoke 202 and pivot shaft 106 combination rotate, as one solid part, about the rotational axis of symmetry that is common to the pivot shaft 106, the flexurized spring collet 104, and the locking nut 102.

Coaxial pivot shafts 106 located on either site of an optical yoke 202, to which the actual optical component is attached, pass through flexurized spring collets 104 located on either side of a base structure 108. There is a ramp angle on the spring collet 104 that engages with a matching locking nut 102. The interference generated between the locking nut 102 and the spring collet 104 causes the flexures of the spring collet to squeeze down onto the pivot shaft 106, applying a purely symmetrical radial force during the locking process. This eliminates any induced rotational torque and prevents the optical component 204 from moving during the locking process after being properly aligned.

Solids mostly expand in response to heating and contract on cooling. This response to temperature change and is expressed in Coefficient of Thermal Expansion (CTE). The materials used in the presented example of the locking apparatus 100 are comprised of stainless steel and therefore CTE matched. However, the remainder of the optical mount is comprised of aluminum, which has a much higher CTE. This may not be a problem because the forces applied in the locking mechanism 100 are orthogonal to the adjustment axes of the optical mount.

It will be appreciated that variations of the above disclosed and other features and functions, or alternatives thereof, may be desirably combined into many other different systems or applications. Also, various presently unforeseen or unanticipated alternatives, modifications, variations or improvements therein may be subsequently made by to skilled in the art which are also intended to be encompassed by the following claims.

Although embodiments of the current disclosure have been described comprehensively in considerable detail to cover the possible aspects, those skilled in the art would recognize that other versions of the disclosure are also possible.

What is claimed is:

1. A temperature insensitive locking apparatus for use with large optical mounts used in precision-aligned laser systems comprising:
   a rigid base structure;
   an optical yoke having a pair of pivot shafts extending therefrom which define a rotational axis of symmetry, and the optical yoke providing a mount for an optical component;

two locking nuts each having an internal threaded portion spaced apart from an internal taper;

two flexurized spring collets which each couple a respective one of the pivoting shafts to the rigid base structure, the two flexurized spring collets having a first end and a second end, the first end forming a sleeve which separates a respective one of the pivoting shafts from the rigid base structure and the second end comprises a plurality of flexures, and an external threaded portion being located between the plurality of flexures and the sleeve;

and the mating internal and external threads join a respective one of the two locking nuts with a respective one of the two flexurized spring collets so that the internal taper engages with the plurality of flexures as the locking nut is rotated clockwise engaging the mating internal and external threads, providing an increased level of a radial clamping force onto the pivot shafts by compressing the plurality of flexures thereby reducing crosstalk and lock-and-walk in the precision-aligned laser system.

2. The apparatus of claim 1, wherein the two flexurized spring collets each comprise a ramp angle that engages with the internal taper of the respective locking nut.

3. The apparatus of claim 1, wherein the two flexurized spring collets each generate an interference when tightened with the two locking nuts that causes the plurality of flexures in each flexurized spring collet to squeeze each respective pivot shaft, applying a purely symmetrical radial force during the locking process.

4. The apparatus of claim 1, wherein one of the pair of pivot shafts is located on either side of the optical yoke.

5. The apparatus of claim 1, wherein one of the two flexurized spring collets is located on either side of the rigid base structure.

6. The apparatus of claim 1, wherein neither the optical yoke nor the pair of pivot shafts are directly contacted by either of the two locking nuts.

7. The apparatus of claim 1, wherein the optical yoke and the pair of pivot shafts are made of materials which have a same coefficient of thermal expansion.

8. The apparatus of claim 1, wherein the pair of pivot shafts and the optical yoke are made of stainless steel.

9. The apparatus of claim 1, wherein the optical yoke and the pair of pivot shafts rotate as a single unit about the rotational axis of symmetry that is common to the pair of pivot shafts, the two flexurized spring collets, and the two locking nuts.

10. The apparatus of claim 1, wherein the optical component requires fine angular or translational adjustment.

11. A system for securely and stably mounting precision-aligned optical components in a rugged environment comprising:

a rigid base structure;

an optical yoke for providing a mount for at least one optical component; and a temperature insensitive locking apparatus for locking the position of the at least one optical component after being aligned, the system comprising:

a pair of pivot shafts extending from the optical yoke to define a rotational axis of symmetry;

two locking nuts each having an internal threaded portion located adjacent to an internal taper;

two flexurized spring collets which each couple a respective one of the pivoting shafts to the rigid base structure, the two flexurized spring collets having a first end and a second end, the first end forming a sleeve which separates a respective one of the pivoting shafts from the rigid base structure and the second end comprises a plurality of flexures, and an external threaded portion being located between the plurality of flexures and the sleeve;

and mating internal and external threads join a respective one of the two locking nuts with a respective one of the two flexurized spring collets so that the internal taper engages with the plurality of flexures as the locking nut is rotated clockwise engaging the mating internal and external threads, providing an increased level of a radial clamping force onto the pair of pivot shafts by compressing the plurality of flexures thereby reducing crosstalk and lock-and-walk in the precision-aligned optical system.

12. The system of claim 11, wherein the two flexurized spring collets generate an interference when tightened with the two locking nuts that causes the plurality of flexures, in each respective flexurized spring collet, to squeeze the respective pivot shaft, applying a purely symmetrical radial force during the locking process.

13. The system of claim 11, wherein the two flexurized spring collets each comprise a ramp angle that engages with the internal taper of the respective locking nut.

14. The system of claim 11 wherein one of the pair of pivot shafts is located on either side of the optical yoke.

15. The system of claim 11, wherein one of the two flexurized spring collets is located on either side of the rigid base structure.

16. The system of claim 11, wherein neither the optical yoke nor the pair of pivot shafts are directly contacted by either of the two locking nuts.

17. The system of claim 11, wherein the optical yoke and the pair of pivot shafts are made of materials which have a same coefficient of thermal expansion.

18. The system of claim 11, wherein the pair of pivot shafts and the optical yoke are both made of stainless steel.

19. The system of claim 11, wherein the optical yoke and the pair of pivot shafts rotate as a single unit about the rotational axis of symmetry that is common to the pair of pivot shafts, the two flexurized spring collets, and the two locking nuts.

20. The system of claim 11, wherein the optical component requires fine angular or translational adjustment.

* * * * *